US011079649B2

(12) United States Patent
Ram et al.

(10) Patent No.: US 11,079,649 B2
(45) Date of Patent: **\*Aug. 3, 2021**

(54) METAL SENSITIZED COLOR CHANGING MATERIAL

(71) Applicant: University of South Florida, Tampa, FL (US)

(72) Inventors: Manoj Kumar Ram, Palm Harbor, FL (US); D. Yogi Goswami, Tampa, FL (US); Elias K. Stefanakos, Tampa, FL (US)

(73) Assignees: UNIVERSITY OF SOUTH FLORIDA, Tampa, FL (US); UNITED STATES DEPARTMENT OF ENERGY, Washington, DC (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/884,201

(22) Filed: Oct. 15, 2015

(65) Prior Publication Data

US 2016/0109776 A1    Apr. 21, 2016

Related U.S. Application Data

(60) Provisional application No. 62/064,272, filed on Oct. 15, 2014.

(51) Int. Cl.
  *G02F 1/153*    (2006.01)
  *C09K 9/02*    (2006.01)
  (Continued)

(52) U.S. Cl.
  CPC .............. *G02F 1/153* (2013.01); *C09K 9/02* (2013.01); *G02F 1/0018* (2013.01); *G02F 1/15165* (2019.01)

(58) Field of Classification Search
  CPC . G02F 1/153; G02F 1/0018; G02F 2001/1515
  (Continued)

(56) References Cited

U.S. PATENT DOCUMENTS 3,708,220 A * 1/1973 Meyers ................. G02F 1/1525
                                                      252/500
4,018,508 A * 4/1977 McDermott .......... G02F 1/1521
                                                      359/272

(Continued)

FOREIGN PATENT DOCUMENTS

WO    WO 2014-074743         5/2014
WO    WO2015/041991    *    3/2015 ............. G02F 1/155

OTHER PUBLICATIONS

Schnitzler et al. "Organic/Inorganic Hybrid Materials Formed From TiO2 Nanoparticles and Polyaniline" J. Braz. Chem. Soc., vol. 15, No. 3, 378-384, 2004.*

(Continued)

*Primary Examiner* — George G King
(74) *Attorney, Agent, or Firm* — Quarles & Brady LLP

(57) ABSTRACT

The subject invention pertains to color changeable, film materials comprising a metal substrate layer; a conducting polymer or conducting polymer composite layer; and an electrolyte layer. The conducting polymer or conducting polymer composite layer of the film material is capable of exhibiting changes in one or more optical properties when the film material is in contact with a metal. The subject invention also pertains to methods of preparing conducting polymer films capable of exhibiting changes in optical properties.

23 Claims, 13 Drawing Sheets
(12 of 13 Drawing Sheet(s) Filed in Color)

(51) Int. Cl.
G02F 1/00 (2006.01)
G02F 1/1516 (2019.01)
(58) Field of Classification Search
USPC .................................. 359/240, 275, 265
See application file for complete search history.

(56) References Cited

U.S. PATENT DOCUMENTS

| 4,893,908 | A * | 1/1990 | Wolf | G02F 1/1533 |
| | | | | 359/275 |
| 6,369,934 | B1 | 4/2002 | Bechinger et al. | |
| 6,515,787 | B1 * | 2/2003 | Westfall | G02F 1/1523 |
| | | | | 359/265 |
| 9,684,218 | B2 * | 6/2017 | Ram | G02F 1/15 |
| 2016/0011482 | A1 * | 1/2016 | Danine | B60R 1/088 |
| | | | | 359/268 |
| 2016/0223878 | A1 * | 8/2016 | Tran | G02F 1/155 |

OTHER PUBLICATIONS

Shen et al. "A Study of Tungsten Trioxide and Polyaniline Composite Films I. Electrochemical and Electrochromic Behavior" J. Electrochem. Soc., vol. 139, No. 7, pp. 1840-1845, Jul. 1992.*
International Chemical Safety Card 0362 http://www.inchem.org/documents/icsc/icsc/eics0362.htm, 2001.*
International Chemical Safety Card 1006 http://www.inchem.org/documents/icsc/icsc/eics1006.htm, 2002.*
Wang et al. "A bi-functional device for self-powered electrochromic window and self-rechargeable transparent battery applications" Nature Communications 5, Article No. 4921, 2014.*
Wikipedia page "Lemon battery" https://en.wikipedia.org/wiki/Lemon_battery, archived 2013 (Year: 2013).*
Wang et al. "Application of Nanostructures in Electrochromic Materials and Devices: Recent Progress" Materials, vol. 3 pp. 5029-5053 (Year: 2010).*
Liu, C.Y. et al., "The Investigation of the Electrochromic Charactistics for the PANI Thin Film by Cyclic Voltammentry and Potentiostatic Method," *Proceedings of the World Congress on Engineering*, 2013, vol. II, pp. 1-5, WCE 2013, Jul. 3-5, 2013, London, UK.
Su, L. et al., "All Solid-State Smart Window of Electrodeposited $WO_3$ and $TiO_2$ Particulate Film with PTREFG Gel Electrolyte," *J. Phys. Chem Solids*, 1998, pp. 1175-1180, vol. 59, No. 8.
Zou, B. et al., Tungsten Oxide and Polyaniline Composite Fabricated by Surfactant-Templated Electrodeposition and Its Use in Supercapacitors, *Journal of Nanomaterials*, 2014, pp. 1-9, vol. 2014, Article ID 813120.
Lacroix, J. C., et al., Polyaniline: A Very Fast Electrochromic Material, Journal of the Electrochemical Society, May 1989, 136(5): 1308-1313, The Electrochemical Society, Inc.
Mortimer, Roger J., Organic electrochromic materials, Electrochimica Acta, 1999, 44:2971-2981, Elsevier Science Ltd.
Paddeu, Sergio, et al., Langmuir-Schaefer films of a poly(o-anisidine) conducting polymer for sensors and displays, Nanotechnology, 1998, 9:228-236, IOP Publishing Ltd, UK.
Ram, M. K., et al., Performance of electrochromic cells of polyaniline in polymeric electrolytes, Journal of Materials Science Letters, 1994, 13:1490-1493, Chapman & Hall.
Ram, Manoj Kumar, et al., Comparative studies on Langmuir-Schaefer films of polyanilines, Synthetic Metals, 1999, 100:249-259, Elsevier Science S.A.
Ram, Manoj Kumar, et al., The electrochromic response of polyaniline and its copolymeric systems, Thin Solid Films, 1997, 303:27-33, Elsevier Science S.A.
International Search Report in International Application No. PCT/US2015/055730, filed Oct. 15, 2015.

* cited by examiner

METAL SENSITIZED COLOR CHANGING MATERIAL

CROSS-REFERENCE TO RELATED APPLICATION

This application claims the benefit of U.S. Provisional Application Ser. No. 62/064,272, filed Oct. 15, 2014, which is hereby incorporated by reference in its entirety.

This invention was made with government support De-EE0003590 awarded by the Department of Energy. The Government has certain rights in the invention.

BRIEF SUMMARY

Aspects of the present invention provide a layered structure comprising a layer of conducting polymer or conducting polymer composite on a metal (e.g., gold, steel, platinum, etc.) or conducting metal oxide (indium tin oxide, fluorine doped tin oxide, etc.) layer on a substrate (e.g., glass, plastic, ceramic, fiber, cloth etc.); and an electrolyte layer. The conducting polymer or conducting polymer composite layer is capable of exhibiting changes in one or more optical properties when the electrolyte comes in contact with a metal.

In some embodiments, the layer on a conducting or metal substrate could be a conducting polymer or conducting polymer composite layer and the electrolyte layer comprises an oxidant and an acid. In other embodiments, the electrolyte layer comprises an acidic oxidant versus separate oxidants and separate acids. Metals capable of initiating an optical property change in the conducting polymer or conducting polymer composite layer include copper, low carbon steel, nickel, zinc, iron, indium, tin, aluminum, manganese, cobalt, palladium, silver, lithium, magnesium, sodium, and alloys thereof.

In another aspect, the present invention provides film materials comprising a conducting metal oxide coated substrate layer, wherein the substrate layer is transparent; a conducting polymer or conducting polymer composite layer; and an electrolyte layer in contact with the conducting polymer or conducting polymer composite layer, wherein the conducting polymer or conducting polymer composite layer exhibits a change in the transparency or opaqueness of the composite layer to visible light when the film material or electrolyte is in contact with a metal. In some embodiments, the film material is transparent when the film material or electrolyte is in contact with a metal.

In other aspects, the present invention provides methods of preparing a conducting polymer film or conducting polymer capable of exhibiting changes in one or more optical properties comprising: contacting a substrate with an electrolyte; and contacting the substrate with a conducting polymer or conducting polymer composite solution. In some embodiments, the nanocomposite film on a substrate consisting of a metal or a conducting metal oxide layer. The conducting polymer film or conducting polymer nanocomposite film are covered with an electrolyte. In some embodiments, the electrolyte solution comprises an acid and ammonium persulfate. In other embodiments, the conducting polymer or conducting polymer nanocomposite film further comprises nanoparticles of $TiO_2$, $WO_3$, $MnO_2$, $SnO_2$, $In_2O_3$, and/or $TiO_2$-$WO_3$, $TiO_2$-$MnO_2$, or $TiO_2$-$SnO_2$. The electrolyte may be a solid electrolyte, a gel electrolyte, an aqueous electrolyte, or a non-aqueous electrolyte.

BRIEF DESCRIPTION OF THE DRAWINGS

The patent or application file contains at least one drawing executed in color. Copies of this patent or patent application publication, with color drawing(s), will be provided by the Office upon request and payment of the necessary fee.

DETAILED DESCRIPTION

Figure 1:
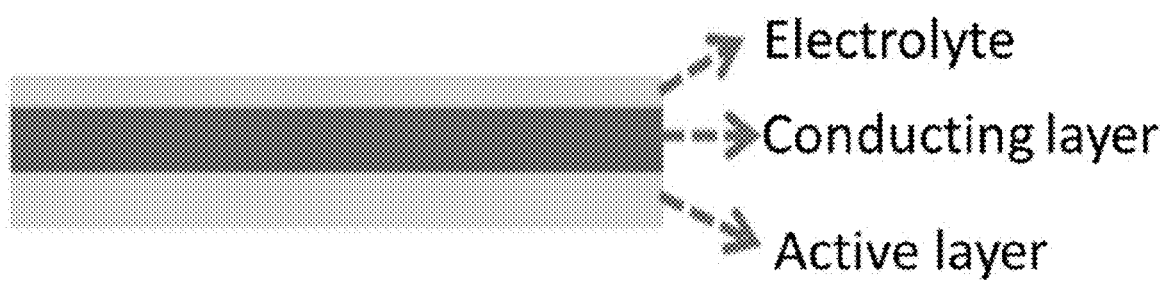
FIG. 1 shows a schematic of the multilayer structure needed for the color change.

Several aspects of the invention are described below, with reference to examples for illustrative purposes only. It should be understood that numerous specific details, relationships, and methods are set forth to provide a full understanding of the invention. One having ordinary skill in the relevant art, however, will readily recognize that the invention can be practiced without one or more of the specific details or practiced with other methods, protocols, reagents, cell lines and animals. The present invention is not limited by the illustrated ordering of acts or events, as some acts may occur in different orders and/or concurrently with other acts or events. Many of the techniques and procedures described, or referenced herein, are well understood and commonly employed using conventional methodology by those skilled in the art.

Unless otherwise defined, all terms of art, notations and other scientific terms or terminology used herein are intended to have the meanings commonly understood by those of skill in the art to which this invention pertains. In some cases, terms with commonly understood meanings are defined herein for clarity and/or for ready reference, and the inclusion of such definitions herein should not necessarily be construed to represent a substantial difference over what is generally understood in the art. It will be further understood that terms, such as those defined in commonly used dictionaries, should be interpreted as having a meaning that is consistent with their meaning in the context of the relevant art and/or as otherwise defined herein.

The terminology used herein is for the purpose of describing particular embodiments only and is not intended to be limiting of the invention. As used herein, the indefinite articles "a", "an" and "the" should be understood to include plural reference unless the context clearly indicates otherwise.

The phrase "and/or," as used herein, should be understood to mean "either or both" of the elements so conjoined, i.e., elements that are conjunctively present in some cases and disjunctively present in other cases.

As used herein, "or" should be understood to have the same meaning as "and/or" as defined above. For example, when separating a listing of items, "and/or" or "or" shall be interpreted as being inclusive, i.e., the inclusion of at least one, but also including more than one, of a number of items, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of."

As used herein, the terms "including", "includes", "having", "has", "with", or variants thereof, are intended to be inclusive similar to the term "comprising."Aspects of the present invention provide a film material comprising a metal oxide coated substrate layer; a conducting polymer or conducting polymer composite layer; and an electrolyte layer. The conducting polymer or conducting polymer composite layer of the film material exhibits a change in at least one optical property when the film material or electrolyte is in contact with a metal. As used herein, the term "optical property" when applied to the materials described herein refers to how the material affects the absorption, reflectance or transmission of light incident upon the material. Optical properties therefore include, but are not limited to, spectral absorption, spectral reflectance, spectral transmittance, phase delay, polarization rotation, polarization reflectance profile, and scattering profile.

In some embodiments, the optical property change can occur in a visible manner to affect a change in color (selective absorption or reflection of certain wavelengths of light) in conducting polymers and conducting polymer nanocomposites and is observed when a metal contact is applied to a polymer in the presence of an electrolyte (1). The conducting polymer has different redox states, and each one can be associated with a different color. The metal contact produces a color change of all states of the conducting polymer or its composite material. Conducting polymers, such as for example polyanilines (PANI), polypyrroles, polythiophenes, etc., and conducting polymer composites with nanomaterials (e.g., $ZnO$, $TiO_2$, $SnO_3$, $WO_3$, rhodamine, Congo red, etc.) show the color change when in contact with the metal. The color change is dependent on the type of conducting polymer, conducting polymer-nanocomposite, thickness of the film, oxidant, acid and the composition of the electrolyte. In addition to liquid electrolytes, embodiments of the present invention provide semisolid or gel based electrolytes to produce color change from dark purple to blue, green, yellow and transparent. Embodiments also provide the material, material film thickness and electrolyte to maximize the color contrast, achieving fast switching times in the coloration and decoloration of the smart film when it comes in contact with specific metals. Further, smart films are provided to achieve color change, such as red to dark blue and yellow to dark blue and vice-versa, by the application of a dye or other conducting polymer film over the PANI or PANI-composite films.

In additional embodiments, the optical property change can occur in at least one of absorption, reflection and transmission in the infra-red range, such as absorption up to 850 nm in a non-visible range). Such infra-red property changes can be applicable to military applications.

In one embodiment, the change in the optical property of the materials described herein causes a change in the visible color of the composite layer. In another embodiment, the change in the optical property causes a change in the transparency or opaqueness of the composite layer to visible light. In further embodiments, the change in the optical property causes a change in the transparency or opaqueness of the composite layer to infra-red radiation.

Process Requirements

In one aspect, the materials utilized for optical property change, e.g., color change, are: (1) indium tin oxide coated glass plate or other suitable conducting substrates, (2) conducting polymer or conducting polymer composite film, and (3) an electrolyte consisting of an acid and an oxidant. FIG. 1 shows the schematic of the process as required to produce optical property change which consists of a three layered structure. The metal or conducting metal oxide film on substrate coated glass plate consisting of the active layer (conducting polymer or conducting nanocomposite) film which can be deposited by electrochemical, solution cast or self-assembly techniques. The electrolyte consists of a combination of the oxidant and an acid. Chemicals and metals required for the optical property change of the film are described herein.

In some embodiments, the first layer is a conducting substrate based on indium tin oxide (ITO) or fluorine doped tin oxide (FTO) or other conducting metal oxides coated on plastic or other suitable substrates such as, for example, glass, fiber, ceramic, or cloth. The first layer can also be the metal substrate(s) (gold, steel, silver, platinum, etc.)

In some embodiments, the conducting polymer and conducting polymer composite are selected from polyanilines (PANI), poly(ortho-anisidine) (POAS), poly(o-toluidine)

(POT), poly(ethoxy-aniline), substituted PANIs, polypyrroles, substituted polypyrroles, polythiophene, polyindole, polycarbazole, substituted polycarbazole and their composite and blending with metal oxide, PANI-rhodamine, polypyrrole-rhodamine, polythiophene-rhodamine, PANI and its derivative-congo red, polypyrrole and its derivative with congo red, polythiophene and its all derivatives with congo red, PANI and its derivative with metal oxide ($WO_3$, $SnO_2$, $In_2O_3$, $TiO_2$ etc.), polypyrrole and its derivative with metal oxide ($WO_3$, $SnO_2$, $In_2O_3$, $TiO_2$ etc.), polythiophene and its derivative with metal oxide ($WO_3$, $SnO_2$, $In_2O_3$, $TiO_2$ etc.), polycarbazole and its derivative with metal oxide ($WO_3$, $SnO_2$, $In_2O_3$, $TiO_2$ etc.).

In some embodiments, the oxidant is selected from aluminum nitrate, ammonium dichromate, ammonium peroxydisulphate, barium nitrate, bismuth nitrate, calcium hypoperchlorate, copper (II) nitrate, cupric nitrate, ferric nitrate, hydrogen peroxide, lithium hydroxide monohydrate, magnesium nitrate, magnesium perchlorate, potassium chlorate, potassium dichromate, potassium permanganate, sodium hypochlorite, sodium periodate, zinc nitrate hydrate, nitric acid, sulfuric acid, perchloric acid, ammonium nitrate, silver nitrate, benzoyl peroxide, tetranitromethane, sodium perchlorate, potassium perchlorate, potassium permanganate, potassium persulfate, sodium nitrate, potassium chromate and other suitable oxidants.

In some embodiments, the acid is selected from acetic acid, propionic acid, hydrochloric acid, hydrofluoric acid, phosphoric acid, sulfuric acid, formic acid, benzoic acid, hydrofluoric acid, nitric acid, phosphoric acid, sulfuric acid, tungstosilicic acid hydrate , hydriodic acid, carboxylic acids, dicarboxylic, tricarboxylic, oxalic acid , hexacarboxylic acid, citric acid, p-camphor sulfonic, $FeCl_3$ and polyacrylic, tartaric acid, and/or oxalic acid.

In another aspect, the materials utilized for optical property change, e.g., color change, are: (1) indium tin oxide coated glass plate or other suitable conducting substrates, (2) conducting polymer or conducting polymer composite film, and (3) an electrolyte consisting of an acidic oxidant. Chemicals containing both oxidant and acidic groups, referred to as acidic oxidants, are selected which show touchchromism with the smart film. Examples of such acidic oxidants include o-iodoxybenzoic acid, peracetic acid, perboric acid, percaboxylic acid, acidic oxidant in combination with the nitric acid product and the carboxylic acid product (citric acid lactic acid, succinic acid, tartaric acid, or their salt combination), and combinations thereof. Further, the acidic oxidants can also be in solid or gel forms and can be dissolved both in aqueous and organic solvents.

The electrolytes utilized in the film materials of the present invention can be in a gel form. The gel containing poly methyl-methacrylate (PMMA) and various polyacrylic acids in organic solvents (propylene carbonate, DMSO, THF, acetonitrile) containing the organic oxidant and acid can be utilized in the films materials to show the color change.

The metals that initiate optical property changes when in contact with the materials of the present invention include, but are not limited to, copper, low carbon steel, nickel, zinc, iron, indium, tin, aluminum, manganese, cobalt, palladium, silver, lithium, magnesium, sodium, etc. and their alloys.

Mechanisms to Show Optical Property Change in PANI

Figure 2:
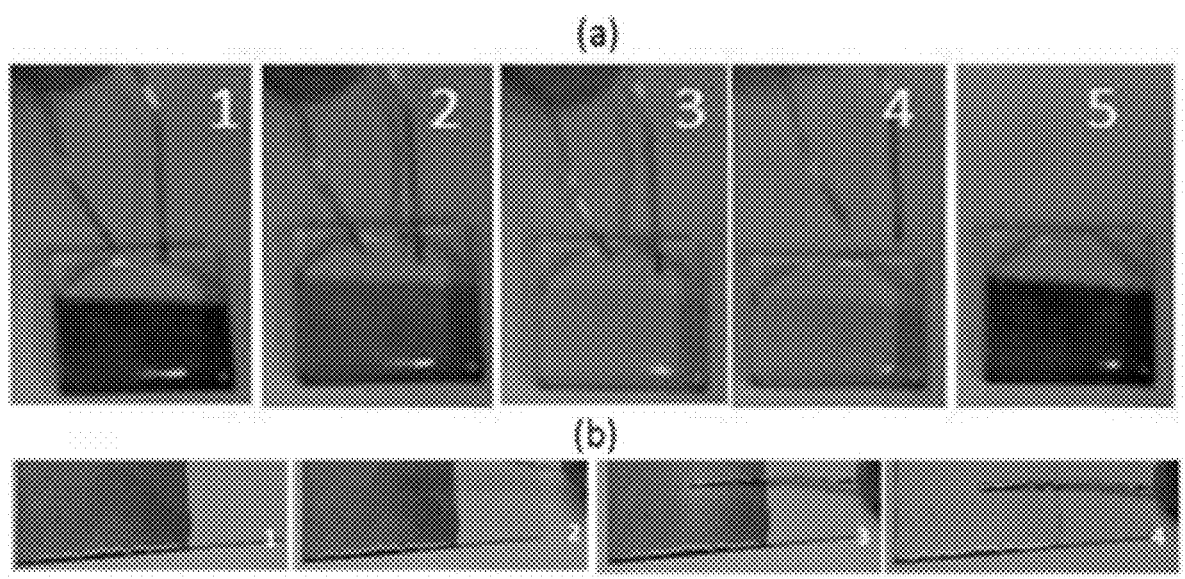
FIG. 2 shows (a) a conducting polymer (CP) film with the electrolyte (1), a metal pin touching the film (2), the color changing in a few seconds (3), the metal contact being removed (4), and the color being restored (5); (b) a CP-composite film/ITO with the electrolyte (1), the pin approaching the surface of the film (2), the pin making contact with the film (3), and, upon contact (almost immediately), the film becoming nearly transparent (4).
Figure 3:
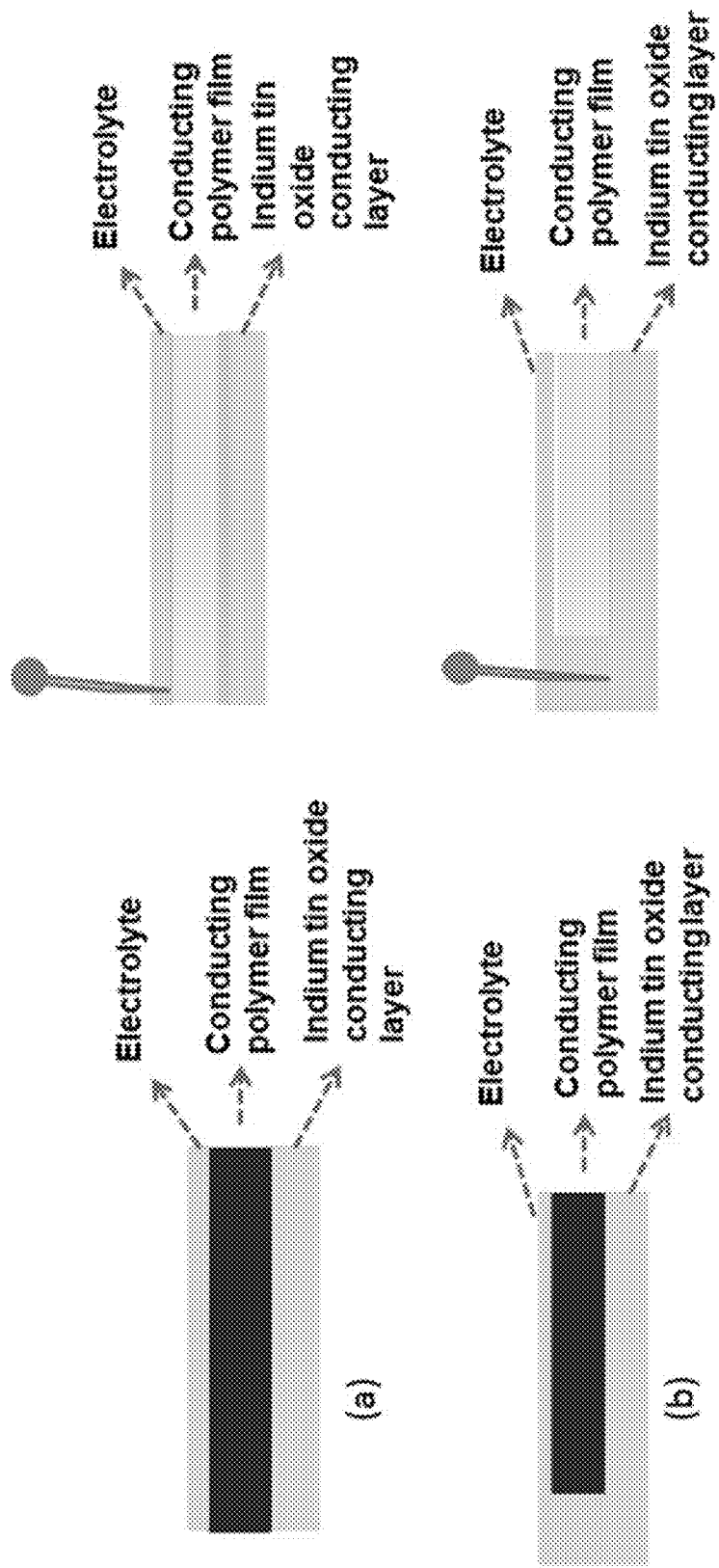
FIG. 3 shows a schematic of color change left (no metal contact) and right (with metal contact). The color changes when the metal pin touches the film or conducting substrate covered with an electrolyte.

In several embodiments of the invention, a conducting polymer and polymer nanocomposite can exhibit various redox properties related to the optical properties of the material. For example, PANI can exist in leucomeraldine (−0.2V) (fade yellow to transparent), EB (0.4-0.6V) (blue to green) and pernigraniline (PNB) (>0.8V) (violet) reversible states (2-7). Thus, PANI needs 'two electrons and two hydrogen atoms' to change PNB to emeraldine (EB), and EB to leucomeraldine state in the presence of an electric field or a solution containing an oxidizing or reducing agent. However, it is observed that PANI changes color from violet to fade yellow to transparent by simply contacting the film with a metallic pin. An electrolytic solution containing a source for hydrogen and electrons which allows the color change from violet to fade yellow to transparent has been utilized, and when the metal is disconnected, the color changes back to violet in a matter of seconds (FIG. 2). FIG. 2 shows the color change using a metal contact on the electrolyte. A schematic of the color change is shown in FIG. 3. FIG. 3 (left) shows the arrangement of film and electrolyte on the ITO surface with no metal contact, and FIG. 3 (right) shows the metal contact with the electrolyte/film/conducting substrate and the metal contact on the electrolyte.

The presence of the oxidant is a significant contributor to the optical property change (e.g, color change) when the polymer is in contact with the electrolyte containing the oxidant and the acid. The color of the film proceeds from dark purple to blue to green to fade yellow with metal contact. Emphasis has been given to understanding the color change. It shows the reaction of the iron (+2) ($Fe^{+2}$) state to the iron (+3) ($Fe^{+3}$) oxidized state in the presence of the electrolyte. In this process, the electron is released from the iron changing the PNB to the emeraldine and subsequently to the LEU state of the PANI. The release of electron(s) and the change of the states of polymer take place in the presence of metal contact with an electrolyte. The metal contact oxidizes the metal in the presence of acid and oxidant and releases electrons which combine with protons (hydrogen ions), reducing the PNB to EB and further to the LEU form of the smart film.

The LEU form is gradually oxidized when the supply of electrons is insufficient in the presence of the oxidant and the acid. The film goes back to its original color of PNB (PNB) in the presence of the electrolyte, thus showing the reversibility of the smart film.

A continuous change of the various states of polyaniline can be obtained with changes in the electrolyte concentration. However, the absorption band from 680 to 850 nm shows the doped states of the pernigraniline form arising from the treatment of the film with an electrolyte containing oxidant and acid.

Figure 4:
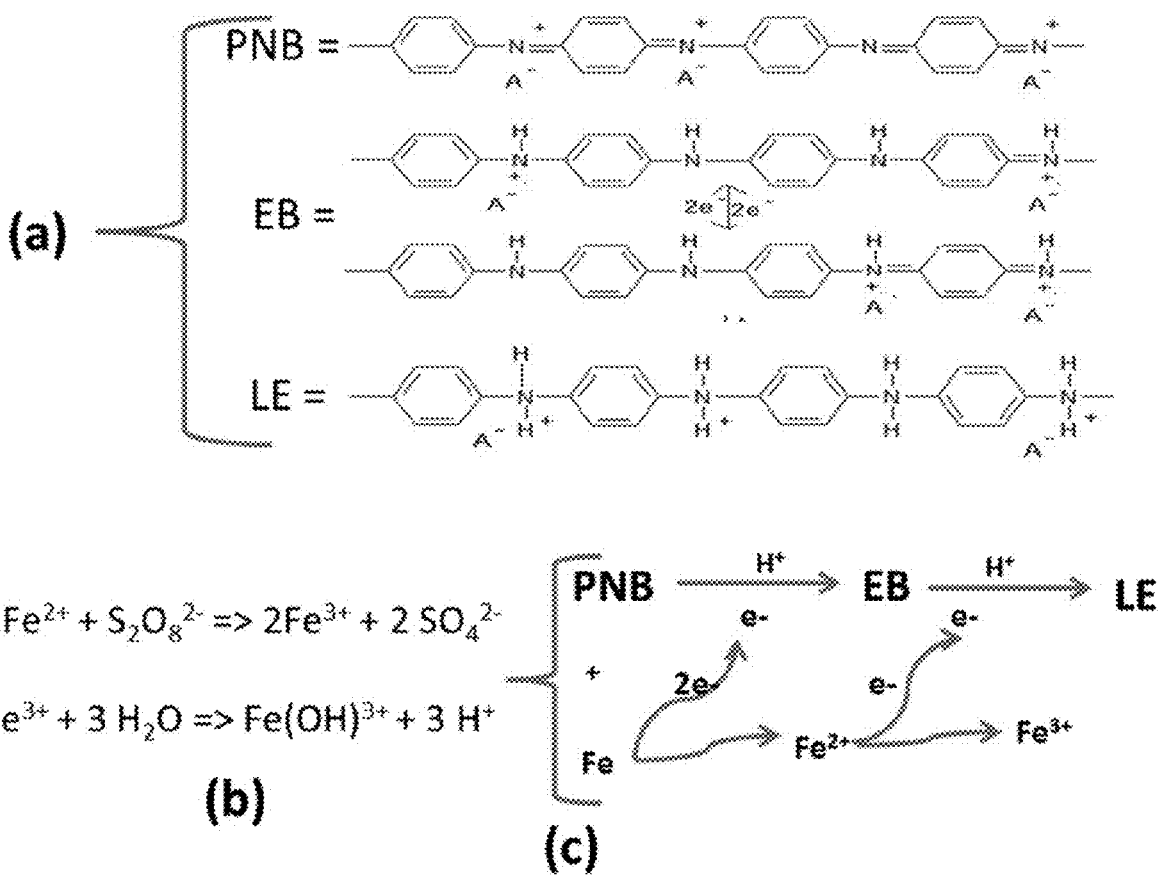
FIG. 4 shows (a) the states of PANI with electrolyte and metal contact; (b) the metal iron is oxidized in the presence of oxidant and acid, (c) the formation of pernigraniline to leucoemeraldine with metal contact.

FIG. 4(a) depicts the structure of PANI of one embodiment of the invention when in the electrolyte and in contact with a metal. In the presence of the electrolyte, the PANI reveals the doped form of PNB. The presence of the oxidant is a significant contributor to the color change when the polymer is in contact with the electrolyte containing the oxidant and the acid. The color of the film proceeds from dark purple to blue to green to fade yellow with metal contact. FIG. 4(b) illustrates the molecular basis for the color change, which shows the reaction of iron (+2) ($Fe^{+2}$) state to the iron (+3) ($Fe^{+3}$) oxidized state in the presence of the electrolyte. In this process, the electron is released from the iron, changing the PNB to the emeraldine and subsequently to the LEU state of the PANI. FIG. 4(c) shows the release of electron and change of the states of polymer in the presence of metal with electrolyte. The metal contact oxidizes the metal in the presence of acid and oxidant and releases electrons which combine with protons (hydrogen ions), reducing the PNB to EB and further to the LEU form of the smart film.

Figure 5:
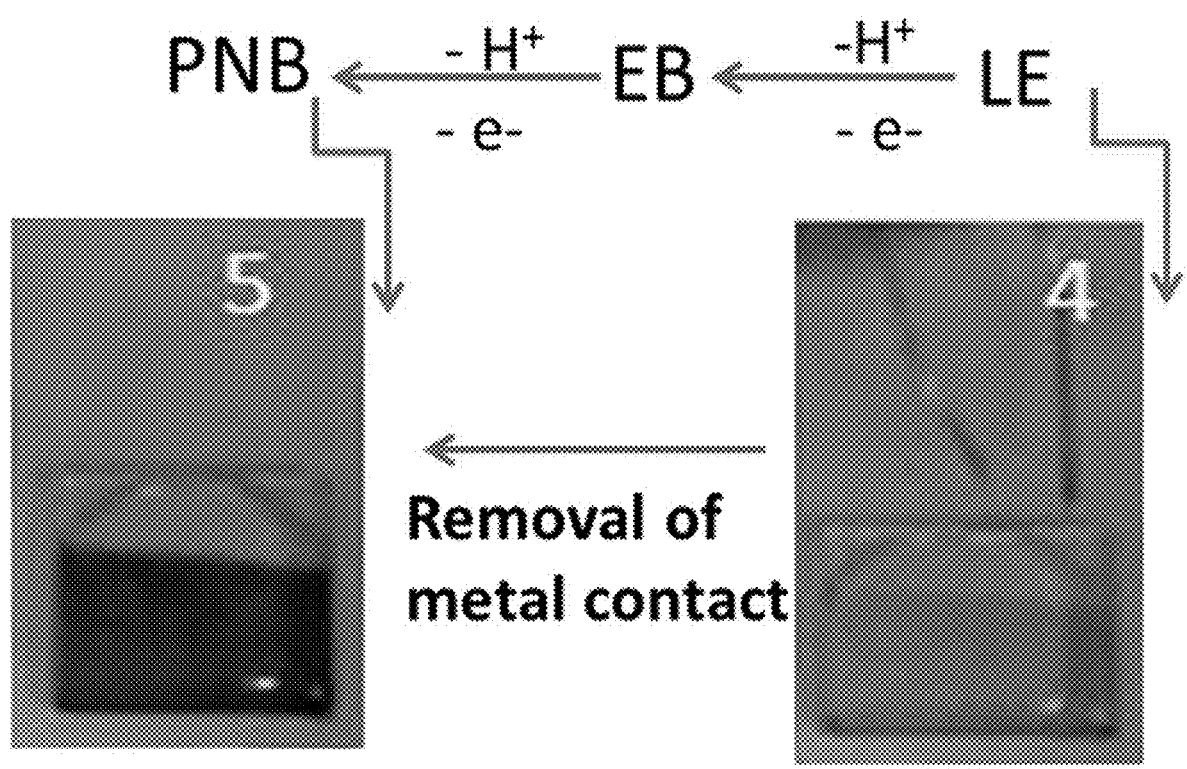
FIG. 5 shows the removal of the metal contact reverses the reaction from LEU to PNB.
Figure 6:
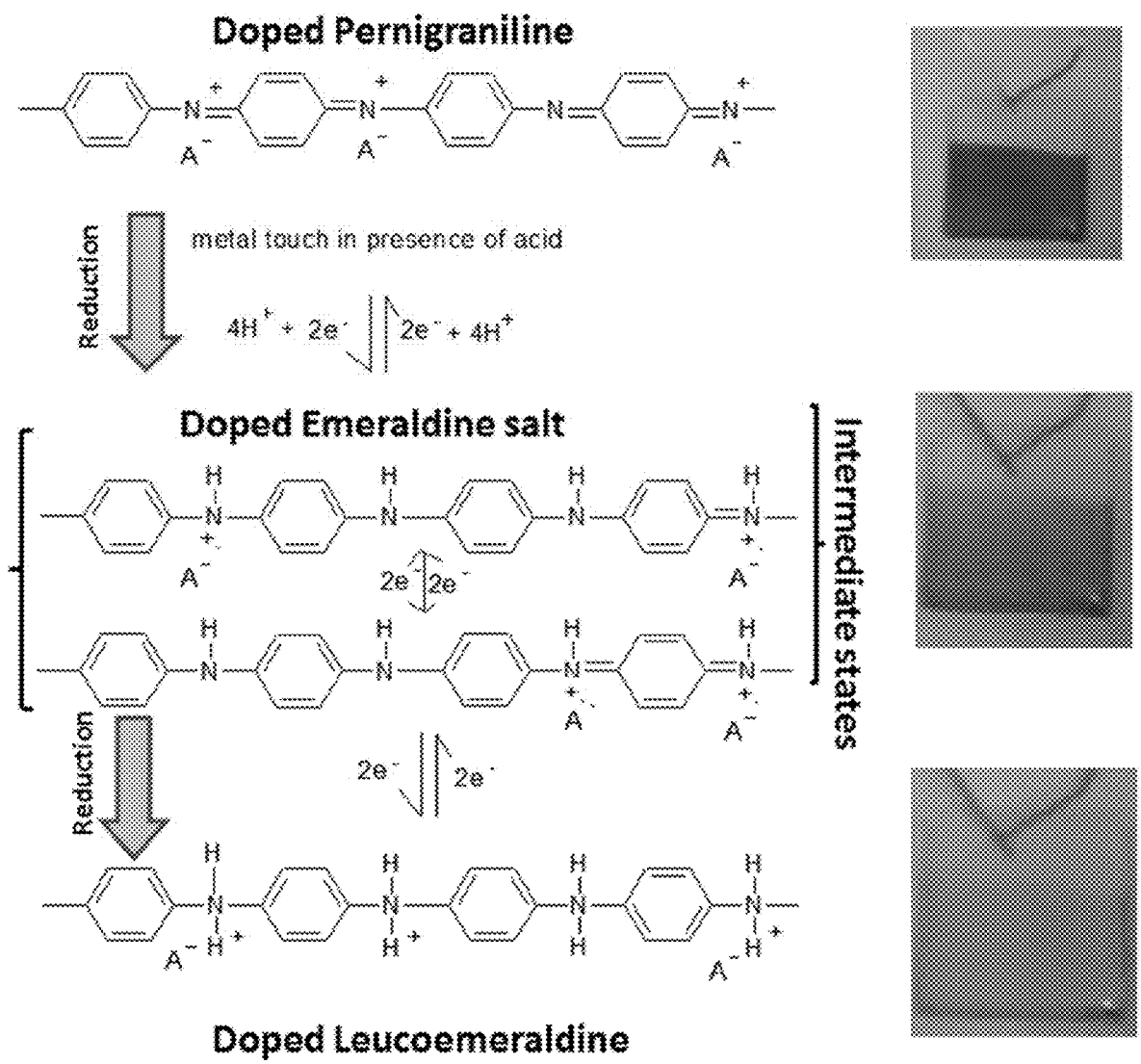
FIG. 6 shows the mechanism of color change in the PANI system while in contact with a metal in the presence of an electrolyte.

FIG. 5 shows the reversibility of leucoemeraldine (LEU) to PNB in the reaction process by removing the metal contact. The LEU form is gradually oxidized due to an insufficient supply of electrons in the presence of the oxidant and the acid. The film goes to its original color of PNB (PNB) in the presence of the electrolyte, thus showing the reversibility of the smart film. The structure of PANI from the doped form to the doped LEU is shown in FIG. 6. The corresponding picture of the film related to the structure is also shown in FIG. 6.

Figure 7:
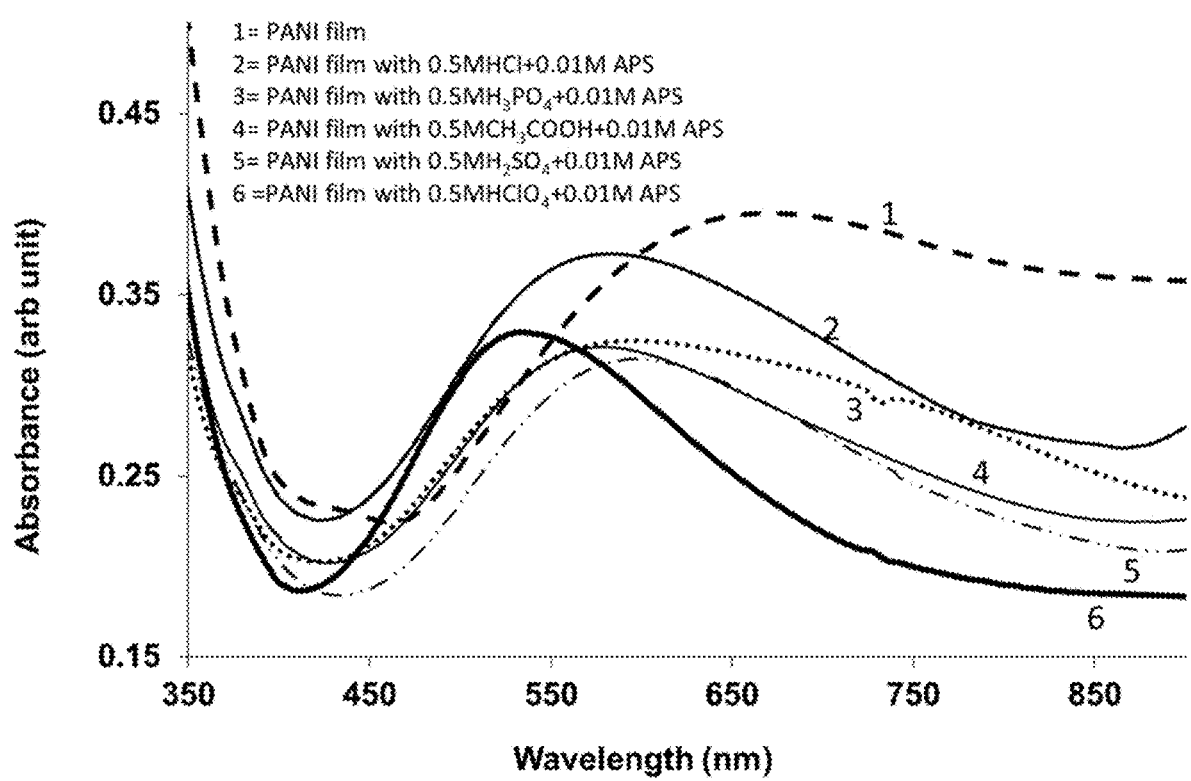
FIG. 7 shows absorbance spectra representative of the color change of a polymer film at different concentrations of electrolyte on an ITO coated glass plate.

FIG. 7 shows the ex-situ measurements of UV-vis absorption of the smart film with different concentrations of electrolyte. A continuous change of the various states of polyaniline can be obtained with changes in the electrolyte concentration. However, the absorption band from 680 to 850 nm shows the doped states of the pernigraniline form arising from the treatment of the film with an electrolyte containing oxidant and acid.

In another aspect, the present invention provides nanocomposite films utilizing conducting polymers with metal oxides and dyes. The films are prepared by using an in-situ self-assembly technique as discussed previously herein. Commercial or freshly prepared nanoparticles of ($TiO_2$, $WO_3$, $SnO_2$, $In_2O_3$ etc.) or dye (rhodamine, Congo red, etc.) are mixed in a solution aniline and HCl before the addition of ammonium persulfate.

In additional aspects, the present invention provides methods of preparing a conducting polymer film capable of exhibiting changes in at least one optical property comprising: contacting a substrate with an electrolyte; and contacting the substrate with a conducting polymer or conducting polymer composite solution. In some embodiments, the conducting polymer or conducting polymer composite solution comprises aniline and ammonium persulfate. In other embodiments, the conducting polymer or conducting polymer composite solution further comprises nanoparticles of $TiO_2$, $WO_3$, $SnO_2$, and/or $In_2O_3$. The electrolyte may be a gel electrolyte, an aqueous electrolyte, or a non-aqueous electrolyte.

In an additional aspect, the present invention provides film materials comprising a conducting metal oxide coated substrate layer, wherein the substrate layer is transparent; a conducting polymer or conducting polymer composite layer; and an electrolyte layer in contact with the conducting polymer or conducting polymer composite layer, wherein the conducting polymer or conducting polymer composite layer exhibits a change in the transparency or opaqueness of the composite layer to visible light when the film material or electrolyte is in contact with a metal. In some embodiments, the film material is transparent when the film material or electrolyte is in contact with a metal. This aspect of the invention provides materials that can have opaque or various colored properties before contact with a metal but provide a transparent (or nearly transparent) material once contact is made with a metal. In certain embodiments, an additional layer containing patterns (e.g., camouflage) may be below the substrate of the film to provide visibility of the pattern upon the transparent shift of the film. Also, as would be understood in the art, the transparent shifting capabilities of the film would provide for a film material that can reveal pictures, letters, signs, drawings, and the like, placed underneath the substrate once contact is made with a metal.

Following are examples that illustrate procedures for practicing the invention. These examples should not be construed as limiting. All percentages are by weight and all solvent mixture proportions are by volume unless otherwise noted.

EXAMPLE 1

Development of the Conducting PANI Film

Figure 8:
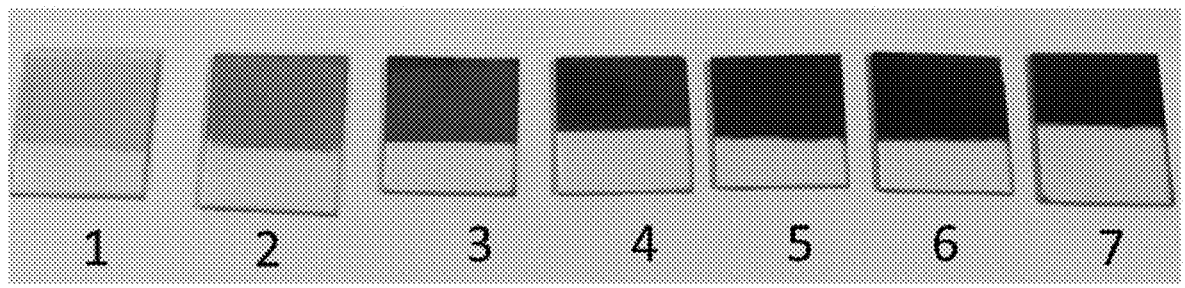
FIG. 8 shows a self-assembled PANI film on a conducting FTO substrate: (1. One layer, 2=2 layers, 3=3 layers, 4=4 layers, 5=5 layers, 6=6 layers and 7=7 layers).

Embodiments of the PANI thin films of the present invention were prepared using an in-situ self-assembly technique that includes varying the concentration of the monomer and the acid. Initially, a cleaned FTO glass was immersed in a solution containing 2 mg/L of polystyrene sulfonic acid (PSS) for 12 hours. The film was then washed in water several times and dried in air. This process allowed the surface to be highly negatively charged due to the negatively charged PSS electrolyte. Later, the PSS treated FTO glass was immersed in a freshly prepared solution consisting of 0.2 M of aniline, 0.2 M HCl and 0.25 M ammonium persulfate at room temperature. One layer of the in-situ self-assembled film was deposited over the conducting FTO for one hour. The film was again washed in water as well as in a 1 M HCl. The $2^{nd}$ layer was then coated over the first layer with additional coatings being obtained following a similar procedure. FIG. 8 shows the PANI film deposited by the in-situ self-assembly technique (1=1 layer, 2=2 layers, 3=3 layers, 4=4 layer, 5=5 layers, 6=6 layers and 7=7 layers) on FTO conducting glass.

EXAMPLE 2

Development of Conducting PANI-Metal Oxide and Conducting PANI-Dye Films

Figure 9:
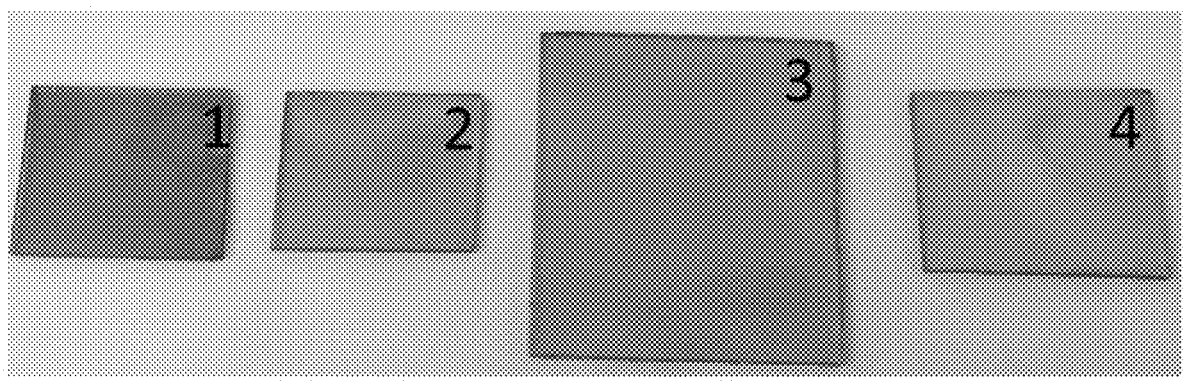
FIG. 9 shows films of embodiments of the present invention fabricated using: 1—self-assembly of PANI; 2—Rhodamine within the PANI using self-assembly; 3—Zinc Oxide within the self-assembly of PANI; and 4—indium oxide within the self-assembly.
Figure 10:
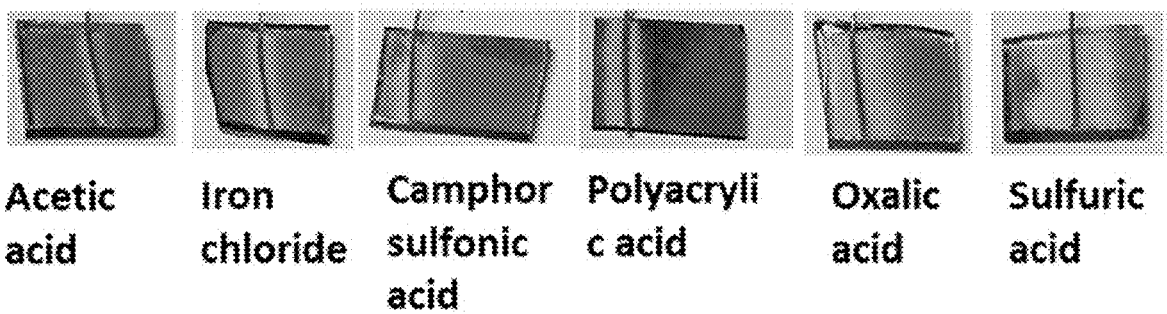
FIG. 10 shows film color changes after metal contact using various acids with APS in the electrolyte.
Figure 11:
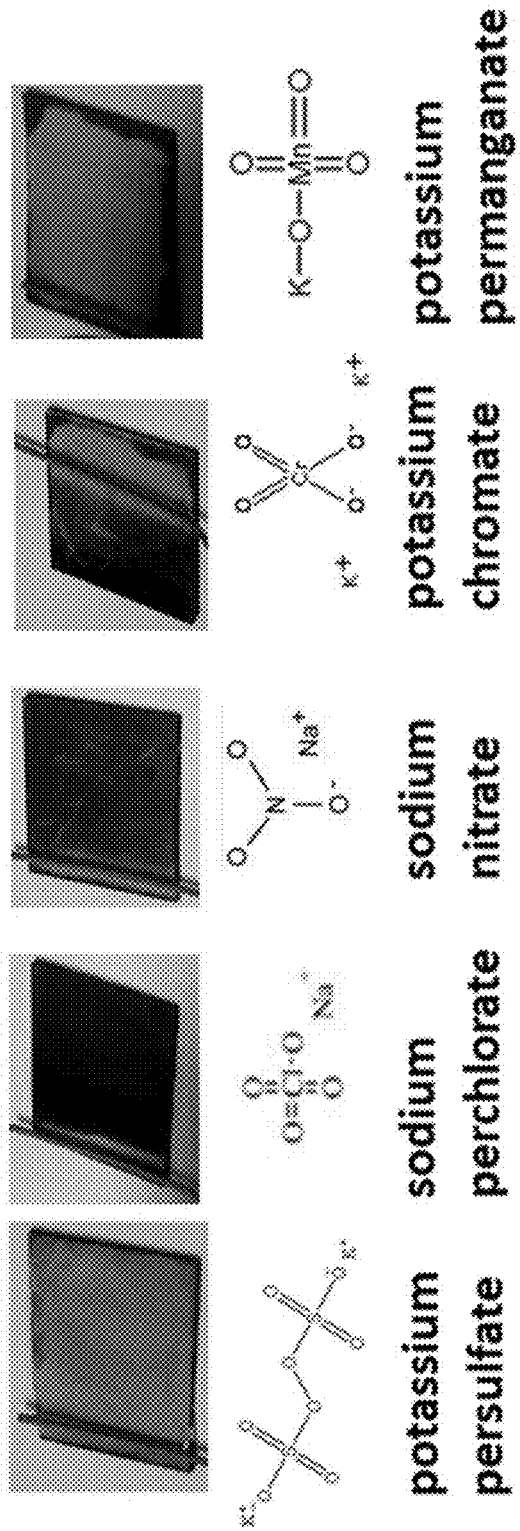
FIG. 11 shows film color changes after metal contact with various oxidants used with HCl in the electrolyte.

Nanocomposite films utilizing conducting polymers with metal oxides and dyes were generated. The films were prepared by using an in-situ self-assembly technique as discussed previously herein. In a non-limiting example, the commercial or freshly prepared nanoparticles of ($TiO_2$, $WO_3$, $SnO_2$, $In_2O_3$ etc.) or dye (rhodamine, congo red, etc.) were mixed in a solution 0.2 M of aniline and 0.2 M HCl before the addition of 0.25 M ammonium persulfate at room temperature. FIG. 9 shows (1) PANI, (2) Rhodamine—PANI, (3) Zinc Oxide—PANI, and (4) Indium Oxide—PANI films. There was a marked change in the color of the conducting polymer—dye and the conducting polymer-metal oxide films. The color change experiments exemplified herein show that the rhodamine—PANI film produces a slower color change from dark blue to light purple. The presence of zinc oxide increases the stability of the film, with a behavior similar to the PANI self-assembled film.

EXAMPLE 3

Acidic Media for Smart Materials

Experiments of color change were carried out on the films of the present invention in order to understand possible acid media using ammonium persulfate (APS) in the electrolyte. Experiments were also carried out to retain various acidic systems in APS using the following: (a) 0.01 M of acetic+0.01 M of APS; (b) 0.01 M of p-camphor sulfonic acid+0.01 M of APS; (c) 0.01 M of $FeCl_3$+0.01 M of APS; (d) 0.01 M of polyacrilic+0.01 M of APS; (e) 0.01 M of p-oxalic+0.01 M of APS; and (f) 0.01 M of p-sulfuric acid+0.01 M of APS. The results show that complete color change can be achieved by using sulfuric acid with APS, similar to HCl containing the APS oxidant.

EXAMPLE 4

Oxidants

Experiments of color change were carried out on films of the present invention to understand the behavior of the oxidant in an electrolyte containing HCl. The experiments were carried out to test various oxidant systems, such as but not limited to: (a) 0.01 M of HCl+0.01 M of potassium persulfate; (b) 0.01 M of HCl+0.01 M of sodium perchlorate; (c) 0.01 M of HCl+0.01 M of sodium nitrate; (d) 0.01 M of HCl+0.01 M of potassium chromate; and (e) 0.01 M of HCl+0.01 M of potassium permanganate. The APS and potassium permanganate oxidants show complete reversibility in the coloration and decoloration of the films.

EXAMPLE 5

Tailoring of Electrolyte

The coloration and decoration of films of the present invention were performed in electrolytes with various concentrations of HCl and APS. The concentration of the electrolyte varied from (a) 0.2 M HCl+0.02 M APS; (b) 0.1 M HCl+0.02 M APS; (c) 0.2 M HCl+0.01 M APS; and (d) 0.1 M HCl+0.01 M APS. The earlier experiments showed a faster change of color of the film material in an electrolyte containing oxalic acid and oxidant APS.

EXAMPLE 6

Metal or Metal Alloy for Coloration and Decoloration in Smart Film

Initially, the experiment was performed using paper pin (contains low carbon steel). Attempts were made to understand the color change in the films using copper, low carbon steel, nickel, zinc and indium alloy. The zinc and indium and low carbon steel have all shown similar results for coloration and decoloration of the films. It was earlier explained that the coloration and decoloration of the film is dependent of the oxidation states of the film.

EXAMPLE 7

The Development of Gel Electrolyte for Smart Material

Figure 12:
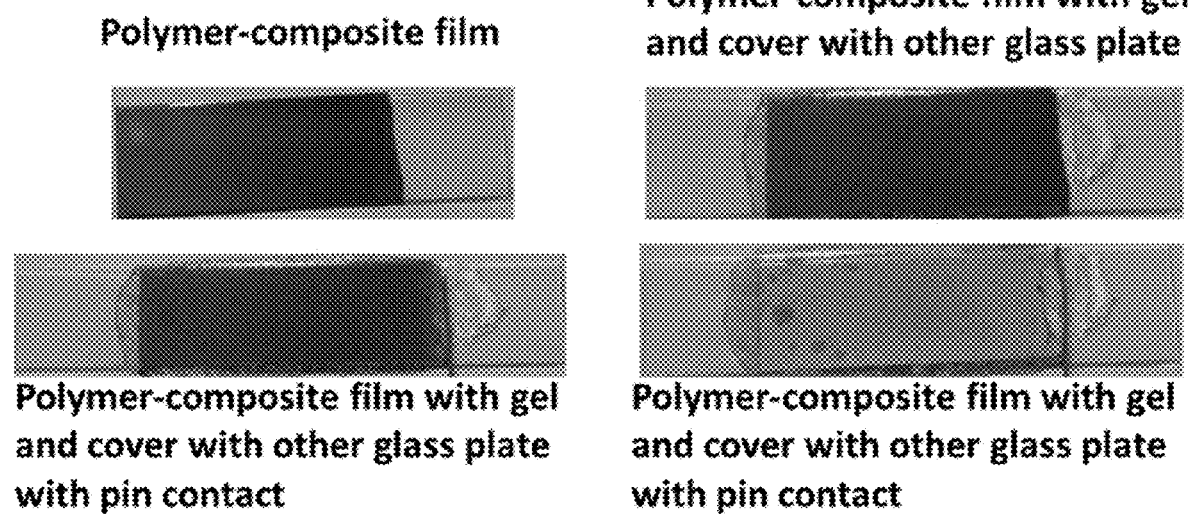
FIG. 12 shows film color changes after metal contact is made at the edge of the glass plate, electrolyte/film/ITO coated glass plate.

The gel electrolyte was obtained by heating 0.5 g of gelatin in 40 ml of deionized water at 60-70° C. The gel was cooled to room temperature and mixed with a solution containing 0.0001 M to 0.1 M of HCl and 0.0001M to 0.01 M of APS. The transparent conducting gel solution was obtained by stirring the solution for several hours. The gel was applied to the polymer composite film and covered by a glass plate. FIG. 12 shows the color of the film changes after metal contact was made at the edge of glass plate containing smart film in gel electrolyte.

EXAMPLE 8

Development of Semi-Solid Electrolyte for Smart Material

Figure 13:
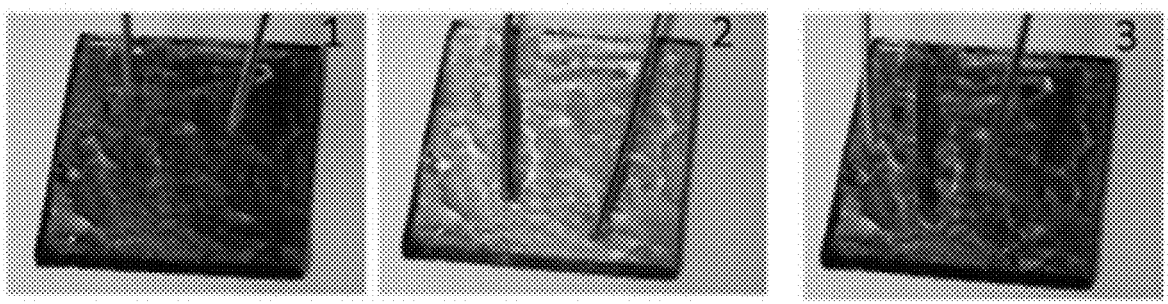
FIG. 13 shows polyvinyl alcohol used with acid to form a new gel that is then used for film color change with a metal contact.

A gel electrolyte was developed by using polyvinyl alcohol (PVA) in water. The gel electrolyte was prepared by adding 4 g of PVA to boiling water with the addition of various moles of HCl and APS. The solution was stirred for several hours and cooled to room temperature. The PVA gel based electrolyte was obtained after cooling to room temperature. The PVA based gel electrolyte can be applied over the film. FIG. 13 shows the coloration and decoloration of the film achieved by using this gel electrolyte and a metal contact. This gel electrolyte works similarly to the acid and oxidant based aqueous electrolyte.

EXAMPLE 9

Non-Aqueous Conducting Gel

Attempts were also made to achieve film color change by using a non-aqueous based electrolyte. Ionically conductive salts were added in a non-aqueous solvent (propylene carbonate, acetonitrile, etc.) with addition of the oxidant APS. The dibenzyl dithiocarbamic acid sodium was added to propylene carbonate in the presence of APS to obtain a non-aqueous electrolyte. The application of the non-aqueous electrolyte over the film showed film color change to yellow with no reversibility.

EXAMPLE 10

Expanding the Color Spectrum for the Smart Material

The color contrast and color range (blue to red) was expanded using copolymerization of two different conducting polymer monomers to fabricate a film. The combination of aniline and o-phenylenediamine (OPD) opens a new color spectrum of red/green/blue, which allows the creation of all colors needed for any displays. The copolymer of aniline and OPD co-polymerized shows the color change from red to blue.

Figure 14:
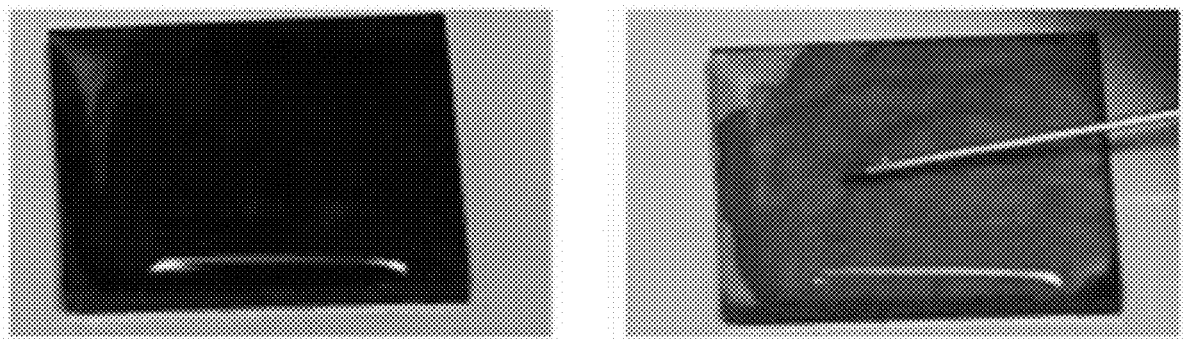
FIG. 14 shows the smart film of an embodiment of the invention in electrolyte (left) and with smart film containing a layer of polyhexylthiophene and electrolyte (right) color change showing red color change with metal contact.
Figure 15A:
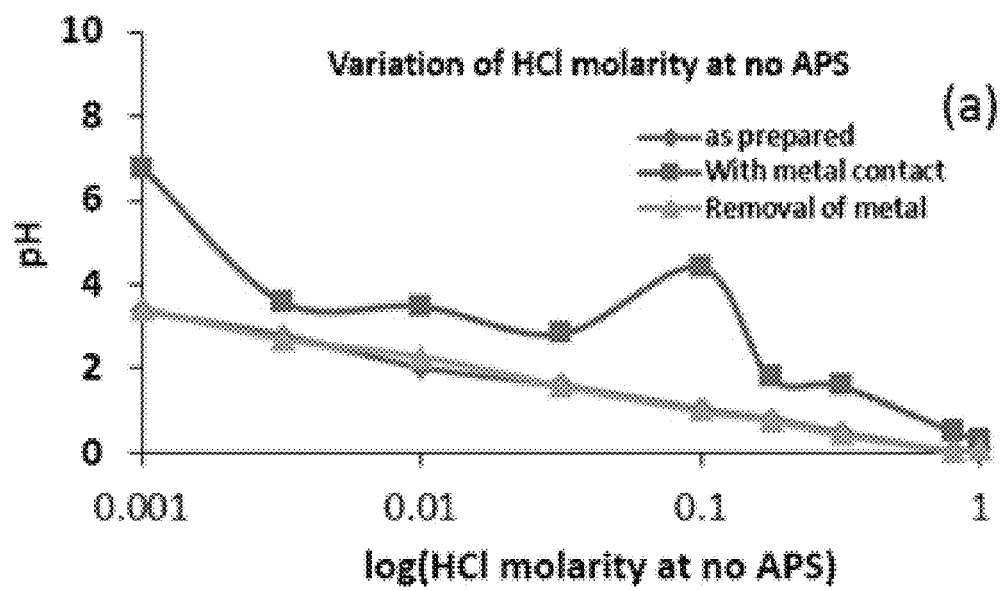
FIG. 15 shows variations of the electrolyte concentration: (a) log of HCl molarity (with no APS) vs pH; (b) log of APS molarity (with no HCl) vs pH; (c) log of HCl molarity (with 0.01M APS) vs pH; and (d) log of APS molarity (with 0.01M HCl).
Figure 15B:
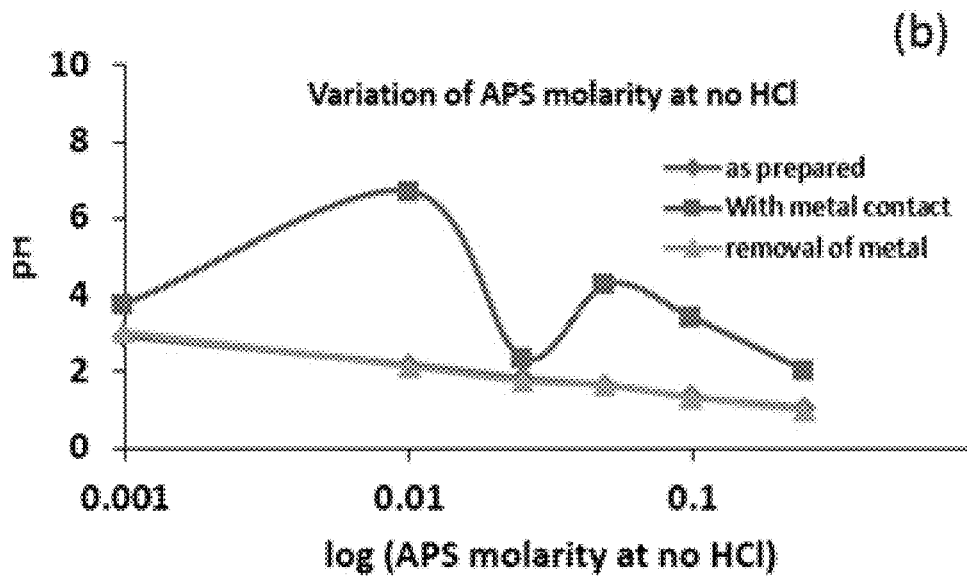
Figure 15C:
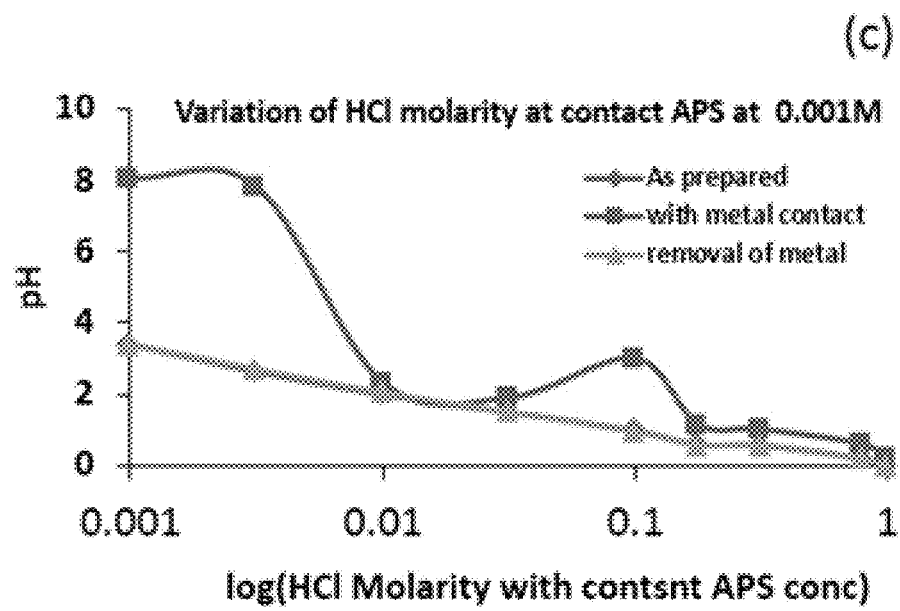
Figure 15D:
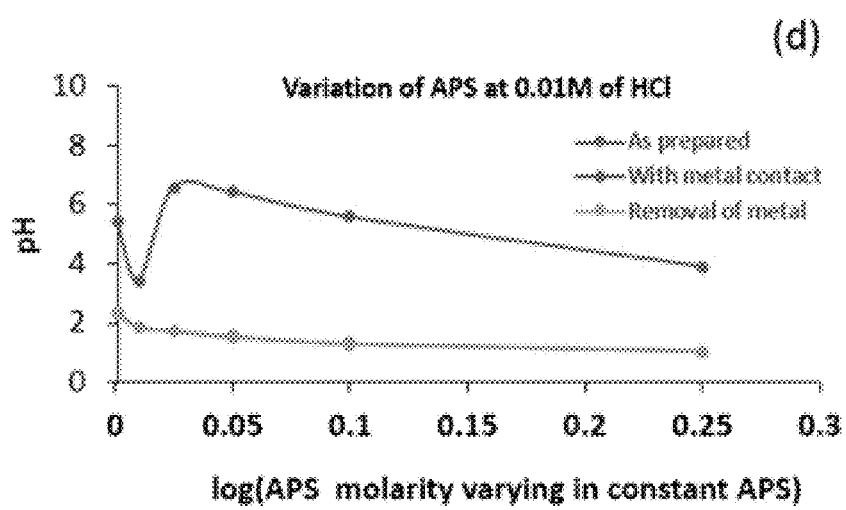

Attempts were made to get two different colors. The polyaniline film produced by the self-assembly method was coated with ragioregular polyhexylthiophene dissolved in chloroform. FIG. 14 shows the change of dark color to red after contact by a metal pin.

EXAMPLE 11

Touchchromism by Varying the pH of the Oxidant (Ammonium Perdisulphate) and Hydrochloric Acid A number of experiments were carried out in order to understand the mechanism(s) of coloration and decoloration of a conducting polyaniline film. FIG. 14($a$) is a plot of the log of HCl electrolyte molarity in the absence of an oxidant (ammonium perdisulphate (APS)) as a function of pH. It is observed that considerable change in the pH takes place when the metal comes in contact with the electrolyte covering the polyaniline film, suggesting a reduction in the hydrogen concentration in the electrolytic solution. However, the pH returns to its initial level when the metal is withdrawn. These changes were observed for an electrolyte concentration of 0.01M. Without APS in the electrolyte the change in color of the polyaniline film is not reversible. Similarly, the presence of only APS in the electrolytic solution has shown no de-coloration of the film, even though there is considerable change in the pH level, shown in FIG. 14($b$), when the metal touches the electrolyte. However, as shown in FIG. 14($c$), a reversible pH level is observed when APS is introduced into HCl. FIG. 14($c$) is a plot of the log of HCl molarity with 0.001M (APS) vs pH. The reversibility in the pH has been observed for HCl concentrations between 0.01 and 0.001 (pH 2 to 4). However, the presence of 0.01M of HCl in varying concentrations of APS produced faster reversibility of the film coloration (FIG. 14($d$)). The change in the pH level with and without a metal contact was observed for different APS concentrations regardless of the type of electrolyte.

EXAMPLE 12

Touchchromic Films for Camouflage Applications

Films of conducting polymers and composites were developed that show quick and dramatic color changes when touched by a metal in the presence of an electrolyte when placed over a patterned cloth. FIG. 15 reveals the pattern of a cloth, placed under the ITO coated glass substrate, when touched by the metal. The pictures shown in FIG. 15 have been extracted from videos and show the change in the color of conducting polymer films before and after metal contact.

EXAMPLE 13

Metal Frame

Figure 16:
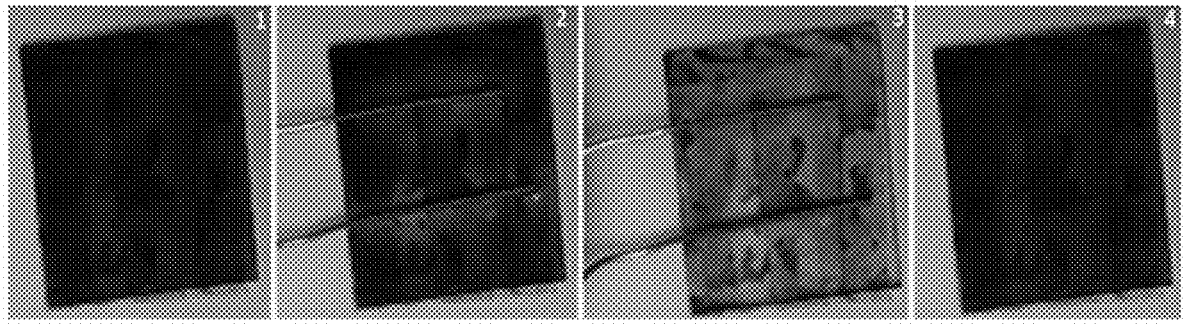
FIG. 16 shows a set of pictures obtained from a video showing a patterned cloth placed underneath the ITO coated glass plate covered by the film and electrolyte. 1: Film with electrolyte on a conducting substrate; 2: immediate metal (pin) contact; 3: few seconds after contact of the metal (pin) with the electrolyte; and 4: a few seconds after removal of the metal (pin) contact (film returning to its initial state).
Figure 17:
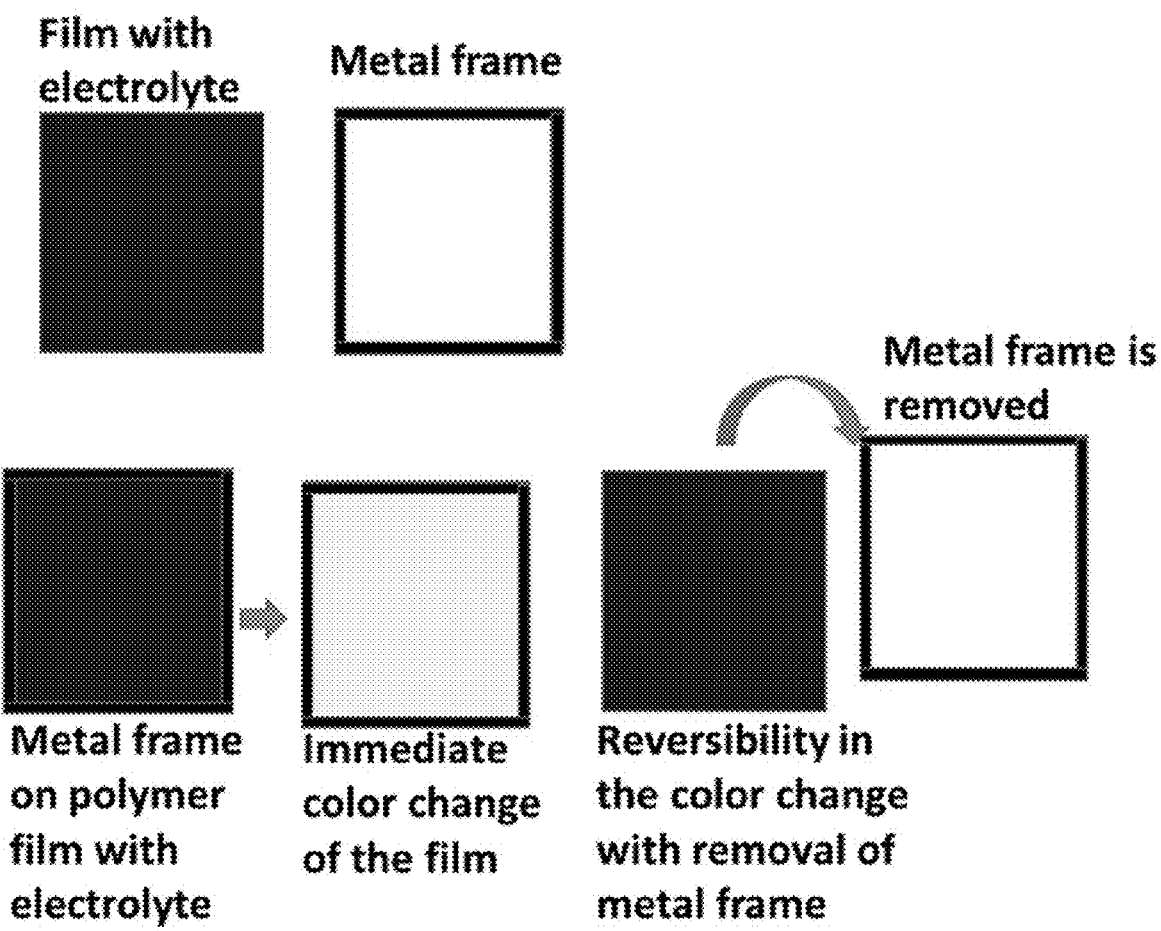
FIG. 17 illustrates touchchromism using a metal frame.

Touchchromism has been found to be faster and more uniform by the use of a narrow metal frame in the perimeter of the smart film. It is challenging and less uniform to change the color film using a small metal contact. Therefore, a metal frame was designed and applied to a touchchromic film to quickly and uniformly change the film color. FIG. 16 shows the film with an electrolyte and the fast change in the film color when the metal frame touches the film. The removal of the metal frame from the film shows reversibility. The uniform color change of the conducting polymer composite film as discussed previously has been exploited by framing different metals. Color changes have been measured in less than a second to minute depending upon the size of the film and type of the metal (Fe, Zn, Ni, Al, In etc.) frame.

Discussion

It has been shown that contact by a metal of an electrolyte covering a conducting polymer or conducting polymer composite can produce controlled color change. Various conducting polymers (polyaniline (PANI), polypyrrole, polythiophenes, etc.) and conducting polymer composites with nanomaterials (ZnO, $TiO_2$, $SnO_3$, $WO_3$, rhodamine, Congo red, etc.) have been found to show color change when in contact with the metal. We have studied the oxidant, acid, semi-solid gel, and type of metal for color change in aqueous and gel type electrolytes and tailored each one to optimize the color change of the film. The device can function without the need of any electrical energy (current or voltage) with the color change resulting from redox process(es) introduced to the polymer film when the metal comes in contact with the electrolyte film. The change in color from dark to red after metal contact has been demonstrated. Special thin films deposited on a conducting substrate covered by an electrolyte can be designed to produce different desired colors. The transmittance & reflectance ranges, spectral characteristics and the speed of coloration & decoloration depend on the specific nature of the films of the invention and the electrolytes. Color changes of the polymer or nanocomposite in a semi-solid electrolyte were demonstrated, and a film and electrolyte was designed to produce color change with a solid based electrolyte.

All patents, patent applications, provisional applications, and publications referred to or cited herein are incorporated by reference in their entirety, including all figures and tables, to the extent they are not inconsistent with the explicit teachings of this specification.

It should be understood that the examples and embodiments described herein are for illustrative purposes only and that various modifications or changes in light thereof will be suggested to persons skilled in the art and are to be included within the spirit and purview of this application and the scope of the appended claims. In addition, any elements or limitations of any invention or embodiment thereof disclosed herein can be combined with any and/or all other elements or limitations (individually or in any combination) or any other invention or embodiment thereof disclosed herein, and all such combinations are contemplated with the scope of the invention without limitation thereto.

REFERENCES

1. Ram, M. K., Stefanakos, E., Goswami, Y. Low cost chromatic devices, US filed provisional patent, 2012.
2. Lacroix J, Kanazawa K, Diaz A. Polyaniline: A very fast electrochromic material. Journal of the electrochemical society. 1989; 136(5):1308-13.
3. Mortimer R J. Organic electrochromic materials. Electrochimica Acta. 1999; 44(18):2971-81.
4. Paddeu S, Ram M K, Carrara S, Nicolini C. Langmuir-Schaefer films of a poly (o-anisidine) conducting polymer for sensors and displays. Nanotechnology. 1998; 9(3): 228.
5. Ram M, Sundaresan N, Malhotra B. Performance of electrochromic cells of polyaniline in polymeric electrolytes. Journal of materials science letters. 1994; 13(20): 1490-3.
6. Ram M K, Adami M, Sartore M, Salerno M, Paddeu S, Nicolini C. Comparative studies on Langmuir-Schaefer films of polyanilines. Synthetic metals. 1999; 100(3):249-59.
7. Ram M K, Maccioni E, Nicolini C. The electrochromic response of polyaniline and its copolymeric systems. Thin Solid Films. 1997; 303(1):27-33.

We claim:
1. A device comprising:
a substrate coated with a substrate metal or a substrate metal oxide, wherein the substrate metal is gold, silver, or platinum and the substrate metal oxide is indium tin oxide or fluorine doped tin oxide, wherein the layer of the substrate metal or the substrate metal oxide is electrically continuous;
an active layer in direct physical contact with a first portion of a top surface of the substrate, wherein the active layer comprises a conducting polymer or a conducting polymer composite layer;
an electrolyte layer in direct physical contact with the active layer; and
a removable contact metal piece,
wherein the electrolyte layer comprises an acidic oxidant or a mixture of an acid and an oxidant;
wherein the active layer changes color and transparency when the electrolyte layer is directly contacted with the removable contact metal piece in the absence of an energy input from an external source; and
wherein the removable contact metal piece comprises copper, low carbon steel, nickel, zinc, iron, indium, tin, aluminum, manganese, cobalt, palladium, lithium, magnesium, sodium, or an alloy thereof, wherein the removable contact metal piece has a first position in which no other element of the device is in contact with the removable contact metal piece, and a second position in which the electrolyte layer is directly contacted with the removable contact metal piece.

2. The device of claim 1, wherein the change in color causes a change in the visible color of the active layer.

3. The device of claim 1, wherein the change in the transparency causes a change in the transparency of the active layer to visible light.

4. The device of claim 1, wherein the active layer comprises the conducting polymer, and the conducting polymer comprises at least one of a polyaniline, poly(ortho-anisidine), poly(o-toluidine), poly(ethoxy-aniline), a substituted polyanaline, a polypyrrole, a substituted polypyrrole, a polythiophene, polyindole, polycarbazole, and substituted polycarbazole.

5. The device of claim 1, wherein the active layer comprises the conducting polymer composite, and the conducting polymer composite comprises at least one of polyaniline-rhodamine, polypyrrole-rhodamine, polythiophene-rhodamine, polyaniline and its derivatives with congo red, polypyrrole and its derivatives with congo red, polythiophene and its derivatives with conga red, polyaniline and its derivatives with metal oxides, polypyrrole and its derivatives with metal oxides, polythiophene and its derivatives with metal oxides, and polycarbazole and its derivatives with metal oxides.

6. The device of claim 1, wherein the substrate is glass, fiber, ceramic, cloth or plastic.

7. The device of claim 1, wherein the electrolyte layer comprises the acidic oxidant, and the acidic oxidant comprises o-iodoxybenzoic acid, peracetic acid, perboric acid, percaboxylic acid, citric acid, lactic acid, succinic acid, tartaric acid, or any combination thereof.

8. The device of claim 1, wherein the removable contact metal piece is an alloy comprising at least two of copper, low carbon steel, nickel, zinc, iron, indium, tin, aluminum, manganese, cobalt, palladium, lithium, magnesium, and sodium.

9. The device of claim 1, wherein the active layer further comprises nanoparticles of $TiO_2$, $WO_3$, $MnO_2$, $SnO_2$, $In_2O_3$, $TiO_2$—$WO_3$, $TiO_2$—$MnO_2$, or $TiO_2$—$SnO_2$.

10. The device of claim 1, wherein the electrolyte layer comprises a first side surface and a second side surface opposite from the first side surface,
wherein substrate comprises a first side surface and a second side surface opposite from the first side surface, and
wherein the first side surface of the electrolyte layer is coplanar with the first side surface of the substrate.

11. The device of claim 10, wherein the active layer further comprises a second side surface opposite from the first side surface, and
wherein the second surface side surface of the electrolyte layer is coplanar with the second side surface of the substrate and the second side surface of the active layer.

12. The device of claim 1, wherein the removable contact metal piece releases electrons when the removable contact metal piece is oxidized by the acidic oxidant or the mixture of an acid and an oxidant, the released electrons along with the presence of hydrogen ions or metal ions causing the changes in color and transparency of the active layer.

13. The device of claim 1 wherein:
the electrolyte layer is in direct physical contact with a top surface of the active layer.

14. The device of claim 1 wherein:
the electrolyte layer is in direct physical contact with a top surface and a first side surface of the active layer and in contact with a second portion of the top surface of the substrate different from the first portion of the top surface of the substrate.

15. A method for changing color and transparency of a conducting polymer film, the method comprising:
a) providing a device comprising:
i) a substrate coated with a substrate metal or a substrate metal oxide, wherein the substrate metal is gold, silver, or platinum and the substrate metal oxide is indium tin oxide or fluorine doped tin oxide, wherein the layer of the substrate metal or the substrate metal oxide is electrically continuous;
ii) an active layer in direct physical contact with a first portion of a top surface of the substrate, wherein the active layer comprises a conducting polymer or a conducting polymer composite layer; and
iii) an electrolyte layer in direct physical contact with the active layer wherein the electrolyte layer comprises an acidic oxidant or a mixture of an acid and an oxidant; and
b) changing the color and transparency of the active layer in the absence of an energy input from an external source by directly contacting a removable contact metal piece with the electrolyte layer of the device, wherein the removable contact metal piece comprises copper, low carbon steel, nickel, zinc, iron, indium, tin, aluminum, manganese, cobalt, palladium, lithium, magnesium, sodium, or an alloy thereof,
wherein the removable contact metal piece has a first position in which no other element of the device is in contact with the removable contact metal piece, and a second position in which the electrolyte layer is directly contacted with the removable contact metal piece.

16. The method of claim 15, wherein the active layer further comprises nanoparticles of $TiO_2$, $WO_3$, $MnO_2$, $SnO_2$, $In_2O_3$, $TiO_2$—$WO_3$, $TiO_2$—$MnO_2$, or $TiO_2$—$SnO_2$.

17. The method of claim 15, wherein the electrolyte layer comprises a gel electrolyte.

18. The method of claim 15, wherein the electrolyte layer comprises a liquid electrolyte.

19. The method of claim 15, wherein the electrolyte layer comprises a non-aqueous electrolyte.

20. The method of claim 15, wherein the electrolyte layer comprises a solid electrolyte.

21. The method of claim 15, wherein the electrolyte layer comprises a first side surface and a second side surface opposite from the first side surface,
wherein substrate comprises a first side surface and a second side surface opposite from the first side surface, and
wherein the first side surface of the electrolyte layer is coplanar with the first side surface of the substrate.

22. The method of claim 21, wherein the active layer further comprises a second side surface opposite from the first side surface, and
wherein the second surface side surface of the electrolyte layer is coplanar with the second side surface of the substrate and the second side surface of the active layer.

23. The method of claim 15, wherein the removable contact metal piece releases electrons when the removable contact metal piece is oxidized by the acidic oxidant or the mixture of an acid and an oxidant, the released electrons along with the presence of hydrogen ions or metal ions causing the changes in color and transparency of the active layer.

\* \* \* \* \*